US010286317B2

United States Patent
Fujisawa

(10) Patent No.: US 10,286,317 B2
(45) Date of Patent: May 14, 2019

(54) PROGRAM AND SYSTEM

(71) Applicant: KABUSHIKI KAISHA SQUARE ENIX, Tokyo (JP)

(72) Inventor: Jin Fujisawa, Shinjuku-ku (JP)

(73) Assignee: KABUSHIKI KAISHA SQUARE ENIX (ALSO TRADING AS SQUARE ENIX CO., LTD.), Tokyo (JP)

( * ) Notice: Subject to any disclaimer, the term of this patent is extended or adjusted under 35 U.S.C. 154(b) by 155 days.

(21) Appl. No.: 15/386,441

(22) Filed: Dec. 21, 2016

(65) Prior Publication Data

US 2017/0173469 A1 Jun. 22, 2017

(30) Foreign Application Priority Data

Dec. 22, 2015 (JP) .................................. 2015-250063

(51) Int. Cl.
| | |
|---|---|
| A63F 13/537 | (2014.01) |
| A63F 13/35 | (2014.01) |
| A63F 13/45 | (2014.01) |
| A63F 13/79 | (2014.01) |
| A63F 13/30 | (2014.01) |

(52) U.S. Cl.
CPC ............ *A63F 13/537* (2014.09); *A63F 13/30* (2014.09); *A63F 13/35* (2014.09); *A63F 13/45* (2014.09); *A63F 13/79* (2014.09)

(58) Field of Classification Search
USPC .......................................................... 463/32
See application file for complete search history.

(56) References Cited

U.S. PATENT DOCUMENTS 7,004,834 B2 * 2/2006 Walker .................... G07F 17/32
273/139
2008/0058099 A1 * 3/2008 Schwartz ................ G07F 17/32
463/29

(Continued)

FOREIGN PATENT DOCUMENTS

| JP | 2013-000498 | 1/2013 |
|---|---|---|
| JP | 2015-008985 | 1/2015 |

(Continued)

OTHER PUBLICATIONS

Japanese Office Action issued in the Japanese Patent Application No. 2015-250063 dated Jan. 17, 2017 along with a partial English language translation.

*Primary Examiner* — Pierre E Elisca
(74) *Attorney, Agent, or Firm* — Greenblum & Bernstein, P.L.C.

(57) ABSTRACT

A non-transitory computer-readable medium including a program product for causing a user terminal to realize functions to control progress of a video game is provided. A set constituted by at least one game element is used in the video game. A user owns the at least one game element in the video game. The functions include: a specifying function configured to specify an event to be carried out by the user; an organizing function configured to refer to the event to organize a recommended set, the recommended set being constituted by a game element configuration that satisfies a predetermined condition; and a displaying function configured to display an image, the image causing the user to recognize information regarding the recommended set organized by the organizing function.

9 Claims, 11 Drawing Sheets

(56) References Cited

U.S. PATENT DOCUMENTS

2012/0202570 A1\* 8/2012 Schwartz ................ G07F 17/32
                                                                            463/10
2013/0252682 A1     9/2013 Umekawa

FOREIGN PATENT DOCUMENTS

| JP | 2015-126784 | 7/2015 |
| --- | --- | --- |
| JP | 5813898 | 11/2015 |

\* cited by examiner

PROGRAM AND SYSTEM

CROSS-REFERENCE TO RELATED APPLICATION

The present application relates to subject matter contained in Japanese Patent Application No. 2015-250063 field on Dec. 22, 2015, the disclosure of which is expressly incorporated herein by reference in its entirety.

BACKGROUND OF THE INVENTION

1. Field of the Invention

At least one of embodiments according to the present invention relates to a program and a system for causing a computer to realize functions to control progress of a video game in which a set constituted by at least one game element that a user owns is used.

2. Description of the Related Art

In conventional systems, there is one in which a party is constituted to cause a video game to proceed.

In such a system, for example, there is one in which a plurality of characters is selected within a range of allowable values to constitute or establish a party (see Japanese Patent Application Publication No. 2013-498).

However, in the conventional system, a player is required to determine whether the number of members in a party is within a range of allowable values or not. For this reason, there has been a problem that a load on the player when to organize a party becomes larger.

SUMMARY OF THE INVENTION

It is an object of at least one of embodiments according to the present invention to solve the problem described above, and to reduce a load to constitute a party.

According to one non-limiting aspect of the present invention, there is provided a non-transitory computer-readable medium including a program product for causing a user terminal to realize functions to control progress of a video game in which a set constituted by at least one game element is used and a user owns the at least one game element.

The functions include a specifying function configured to specify an event to be carried out by the user.

The functions also include an organizing function configured to refer to the event to organize a recommended set, the recommended set being constituted by a game element configuration that satisfies a predetermined condition.

The functions also include a displaying function configured to display an image, the image causing the user to recognize information regarding the recommended set organized by the organizing function.

According to another non-limiting aspect of the present invention, there is provided a system for controlling progress of a video game in which the system includes a communication network, a server, and a user terminal. A set constituted by at least one game element is used in the video game.

The system includes a specifying section configured to specify an event to be carried out by the user.

The system also includes an organizing section configured to refer to the event to organize a recommended set, the recommended set being constituted by a game element configuration that satisfies a predetermined condition.

The system also includes a displaying section configured to display an image, the image causing the user to recognize information regarding the recommended set organized by the organizing section.

According to still another non-limiting aspect of one embodiment according to the present invention, there is provided anon-transitory computer-readable medium including a program product for causing a server to realize functions to control progress of a video game. A set constituted by at least one game element is used in the video game, and a user owns the at least one game element.

The functions include a specifying function configured to specify an event to be carried out by the user.

The functions also include an organizing function configured to refer to the event to organize a recommended set, the recommended set being constituted by a game element configuration that satisfies a predetermined condition.

The functions also include a displaying function configured to carry out a process to cause a user terminal to display an image, the image causing the user to recognize information regarding the recommended set organized by the organizing function.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like does not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like does not occur in the content of the processing.

First Embodiment

Figure 1:
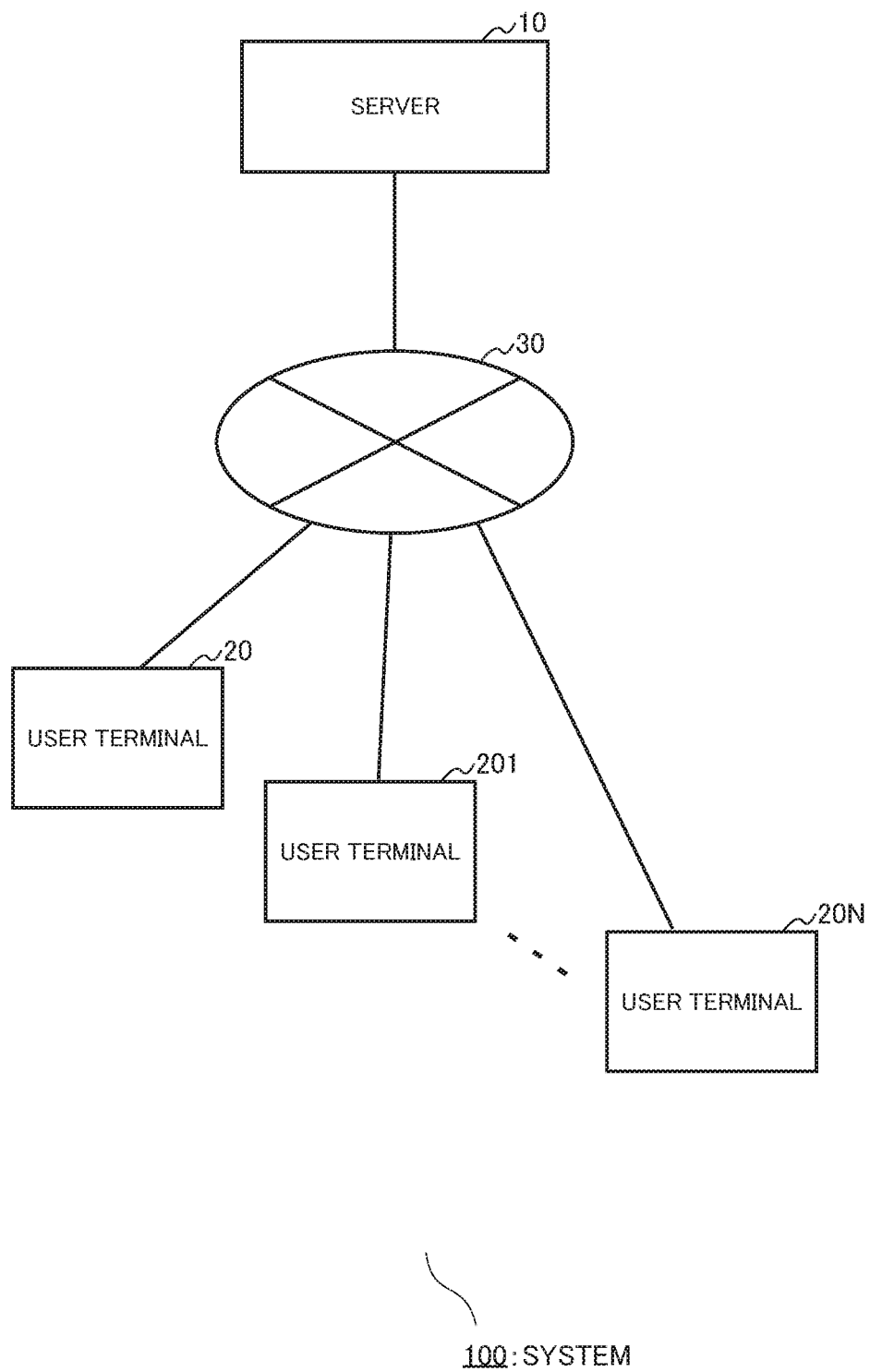
FIG. 1 is a block diagram showing an example of a configuration of a system corresponding to at least one of embodiments according to the present invention.

FIG. 1 is a block diagram showing an example of a configuration of a system 100 according to one embodiment of the present invention. As shown in FIG. 1, the system 100 includes a server 10 and a plurality of user terminals 20 and 201 to 20N ("N" is an arbitrary integer), each of which is used by a user of the system. In this regard, a configuration of the system 100 is not limited to this configuration. The system 100 may be configured so that a plurality of users uses a single user terminal, or may be configured so as to include a plurality of servers.

Each of the server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The system 100 includes the server 10 and the plurality of user terminals 20, 201 to 20N, whereby various kinds of functions for carrying out various kinds of processes in response to an operation of the user are realized.

The server 10 is managed by an administrator of the system 100, and has various kinds of functions to provide information regarding the various kinds of processes to the plurality of user terminals 20, 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processes, such as a control section and a communicating section, as a computer. However, its explanation herein is omitted. Further, in the system 100, it is preferable that the server 10 manages various kinds of information from a point of view to reduce a processing load on each of the plurality of user terminals 20, 201 to 20N. However, a storage region may be provided in a state that the server 10 can access the storage region. For example, the server 10 may be configured so as to be provided with a dedicated storage region outside the server 10.

Figure 2:
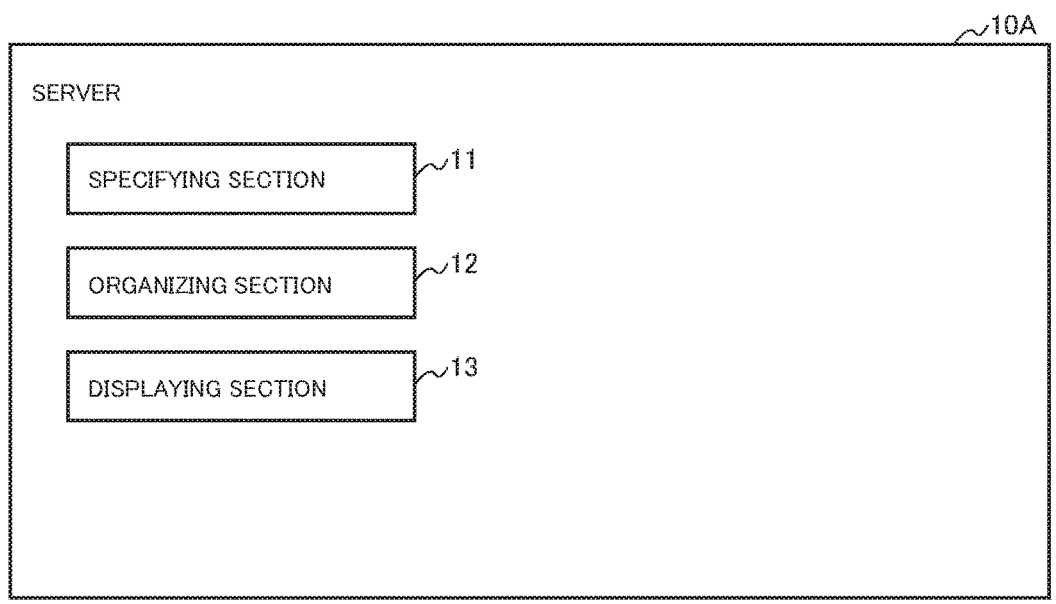
FIG. 2 is a block diagram showing a configuration of a server corresponding to at least one of the embodiments according to the present invention.

FIG. 2 is a block diagram showing a configuration of a server 10A that is an example of the configuration of the server 10. As shown in FIG. 2, the server 10A at least includes a specifying section 11, an organizing section 12, and a displaying section 13.

In a video game carried out in the system 100 according to the present embodiment, a set constituted by at least one game element that the user owns is used.

Here, the "set" means a group of game elements that is constituted by at least one game element. As examples of the set, there are a "deck", a "party" and the like.

Here, the "game element" means a virtual card and an item that a player can obtain in the video game. As one example of the game element, there are a virtual card, equipment and the like with which character information is associated, wherein various kinds of parameters are set up to the character information.

The specifying section 11 has a function to specify an event that is to be carried out by the user.

Here, the "event that is to be carried out by the user" means one element of the video game played by the user.

Further, the "event" means an event or occurrence that can occur in the video game. The configuration of the event is not limited particularly. However, it is preferable that it is a configuration in which a game element is used by the user. As an example of the event, there is a fight carried out by the user in the video game. As examples of such a fight, there are a fight against an enemy character, a mission and the like.

Further, the "fight" is game content in which a game element included in a recommended set is caused to fight against an enemy character on the basis of a program stored in a predetermined storage region. As one example of fight, there are a battle and the like.

The organizing section 12 has a function to refer to an event to organize a set, which is constituted by a game element configuration that satisfies a predetermined condition (hereinafter, referred to also as "recommended set"). In this regard, the word "recommended" herein is used for clarifying its explanation. The configuration to recommend a set that satisfies the predetermined condition for the user is not essential.

Here, the phrase "refer to an event" means referring to information regarding the event and/or a storing section for storing the information regarding the event. The configuration to refer to the event is not limited particularly. However, it is preferable that the organizing section 12 can directly refer to necessary information. As an example of the configuration to refer to the event, there are a configuration "refers to a parameter associated with an enemy character that appears an event" and the like.

Further, the "predetermined condition" means a condition defined in advance. The content of the predetermined condition is not limited particularly. However, it is preferable that the predetermined condition is one that the user can recognize. As examples of the predetermined condition, there are a "condition to become more advantageous strength than strength of an enemy character that appears in an event" and a "condition to become the same strength as strength of an enemy character that appears in an event".

Further, the "game element configuration" means a configuration of the set constituted by one or more game element. Namely, the game element configuration may mean one game element, or may mean a plurality of game elements. In this regard, as examples of the game element configuration, there are the number of game elements and a name of each of the game elements, or the various kinds of parameters, and the like.

The displaying section 13 has a function to carry out processing to cause a display device included in each of the user terminals 20, 201 to 20N to display, on a display screen thereof, an image by which the user is caused to recognize information regarding the recommended set organized by the organizing section 12 (hereinafter, referred to also as a "game image"). A process to generate image information regarding the game image is carried out by the function of the displaying section 13, for example.

Here, as one example of the "information regarding the recommended set", there are information for causing the display device to display a list of game elements contained in the recommended set on the display screen, and the like.

In this regard, the configuration to cause the user to recognize the information regarding the recommended set is not limited particularly. However, it is preferable that the information is displayed by the display device in a specific form. As examples of such a configuration, there are a "configuration in which the game elements contained in the recommended set are displayed in a list" and the like.

Further, the phrase "cause the display device to display an image on the display screen" means causing the user terminal 20 or the like to output an image on the display device included therein by means of communication using the communication network 30. As an example of the configuration to cause the display device to display an image, there is a configuration in which information (image information) generated at a server side is transmitted to a terminal side. In this regard, the configuration of the image information is not limited particularly. For example, the image information may be information in which an image is compressed, or information for causing the terminal side to generate an image. As an example of the information in which an image is compressed, there is one used in a cloud game (for example, MPEG). Further, as an example of the information for causing the terminal side to generate an image, there is one used in an online game (for example, positional information).

Each of the plurality of user terminals 20, 201 to 20N is managed by a user, and is configured by a communication terminal, such as a cellular phone terminal, a PDA (Personal Digital Assistants), a mobile game device, and a so-called wearable divide, by which the user can play a network delivery type game, for example. In this regard, a configuration of the user terminal that the system 100 can include is not limited to the examples described above. It may be a configuration in which the user can recognize the video game. As other examples of the user terminal, there are a combination of various kinds of communication terminals, a personal computer, and a stationary game device.

Further, each of the plurality of user terminals 20, 201 to 20N is connected to the communication network 30, and includes hardware (for example, a display device for displaying a game image) and software for carrying out various kinds of processing by communicating with the server 10. In this regard, each of the plurality of user terminals 20, 201 to 20N may be configured so as to be capable of directly communicating with each other without the server 10.

Next, an operation of the system 100 according to the present embodiment will be described.

Figure 3:
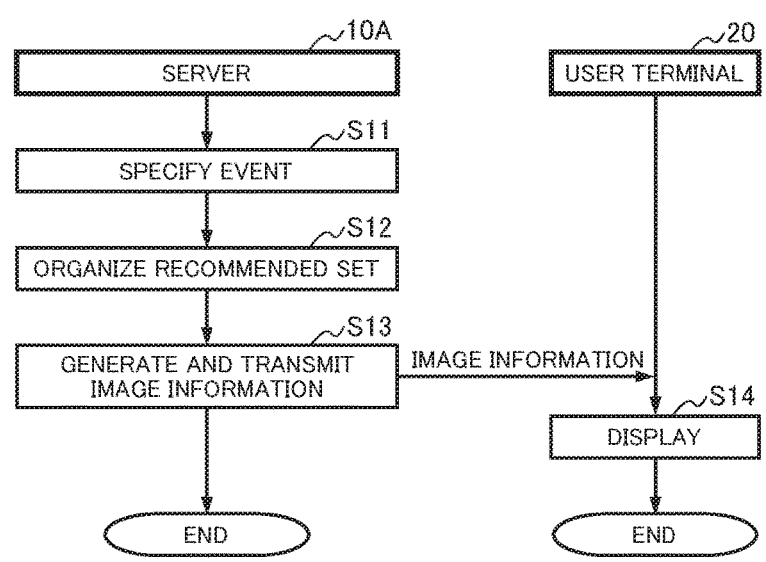
FIG. 3 is a flowchart showing an example of output processing corresponding to at least one of the embodiments according to the present invention.

FIG. 3 is a flowchart showing an example of output processing carried out by the system 100. In the output processing according to the present embodiment, processes related to output of a game image are carried out. Hereinafter a case where the server 10A and the user terminal 20 (hereinafter, referred to as a "the terminal 20") carry out input/output processing will be described as an example.

The output processing is started in a case where an input for playing an event is received from the user, for example.

In the output processing, the server 10A first specifies an event that is to be carried out by the user (Step S11). For example, the terminal 20 transmits, to the server 10A, information regarding an "input for playing an event" received from the user, and the server 10A specifies the event on the basis of the information regarding the input received from the terminal 20.

In this regard, the configuration in which the server 10A specifies the event is not limited particularly. However, it is preferable that it is a configuration in which specification is carried out by referring to the information regarding the event stored in a predetermined storage region and the information regarding the input received from the terminal 20.

When the event is specified, the server 10A refers to the event to organize a recommended set, which is constituted by a game element configuration that satisfies a predetermined condition (Step S12). For example, the server 10A specifies a game element configuration to become the same strength as that of the event, and organizes the specified game element configuration as the recommended set.

When the recommended set is organized, the server 10A causes the display device to display an image by which the user is caused to recognize information regarding the recommended set thus organized (Step S13). For example, the server 10A generates image information for causing the display device to display an image by which the user is caused to recognize the information regarding the recommended set thus organized, and transmits the generated image information to the terminal 20.

The terminal 20 causes the display device to display, on the display screen, the image by which the user is caused to recognize the information regarding the recommended set thus organized, on the basis of the received image information (Step S14).

When the display device included in the terminal 20 displays the image, the system 100 terminates the processing herein.

Figure 4:
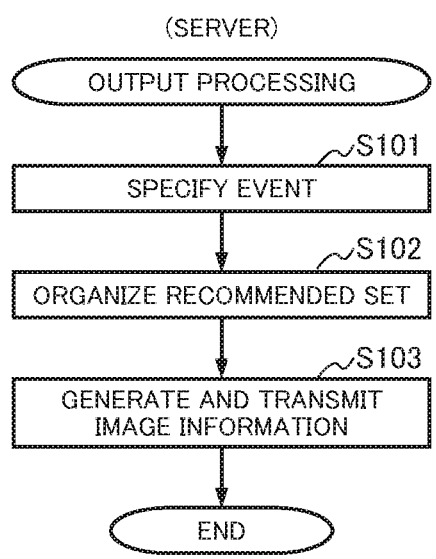
FIG. 4 is a flowchart showing an example of an operation of a server side in the output processing corresponding to at least one of the embodiments according to the present invention.

FIG. 4 is a flowchart showing an example of an operation of the server 10A side in the output processing. Here, the operation of the server 10A in the system 100 will be described again.

In the output processing, the server 10A first specifies an event to be carried out by the user (Step S101); refers to the specified event to organize a recommended set, which is constituted by game element configurations each of which satisfies a predetermined condition (Step S102); and causes the display device to display an image by which the user is caused to recognize information regarding the recommended set thus organized (Step S103). In the present embodiment, as an example to cause the display device to display, the server 10A generates image information for displaying the image by which the user is caused to recognize the information regarding the recommended set thus organized, and transmits the generated image information to the terminal 20.

Figure 5:
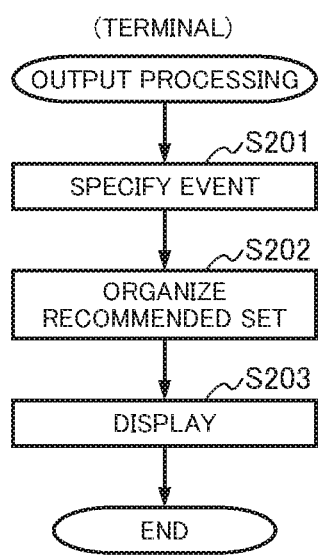
FIG. 5 is flowchart showing an example of an operation of a terminal side in the output processing corresponding to at least one of the embodiments according to the present invention.

FIG. 5 is a flowchart showing an example of an operation of the terminal 20 side in a case where the terminal 20 carries out the output processing. Hereinafter, the case where the terminal 20 carries out the output processing by a single body will be described as an example. In this regard, a configuration of the terminal 20 includes similar functions to the configuration of the server 10 except that the terminal 20 receives various kinds of information from the server 10. For this reason, it is omitted from a point of view to avoid repeated explanation.

In the output processing, the terminal 20 first specifies an event to be carried out by the user (Step S201). The terminal 20 refers to the specified event to organize a recommended set, which is constituted by a game element configuration that satisfies a predetermined condition (Step S202). The terminal 20 then causes the display device to display information regarding the recommended set thus organized on the display screen (Step S203). In the present embodiment, as an example of causing the display device to display an image on the display screen, the terminal 20 generates image information for causing the display device to display an image by which the user is caused to recognize the information regarding the recommended set thus organized; and causes the display device to display the image on the display screen on the basis of the generated image information.

As explained above, as one side of the first embodiment, the server 10A for controlling progress of the video game in which the set constituted by at least one game element that the user owns is used is configured so as to include the specifying section 11, the organizing section 12, and the displaying section 13. Thus, the event to be carried out by the user is specified; the recommended set that is constituted by the game element configuration is organized by referring to the event, the game element configuration satisfying the predetermined condition; and the display device included in the user terminal is caused to display the image by which the user is caused to recognize the information regarding the recommended set thus organized. Therefore, it becomes possible to reduce a load to create a set.

Namely, as one side of the first embodiment, the system 100 can organize a recommended set in accordance with an event, and cause the display device to display the recommended set thus organized on the display screen. For this reason, it becomes possible to reduce a load on the user when to create a set compared with conventional one.

Second Embodiment

Figure 6:
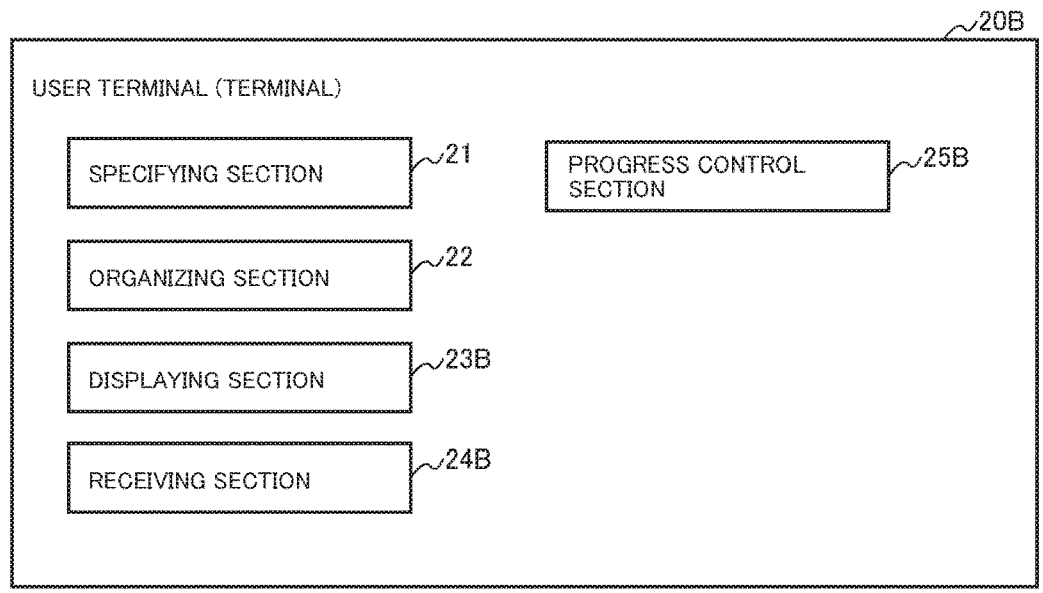
FIG. 6 is a block diagram showing a configuration of a user terminal corresponding to at least one of the embodiments according to the present invention.

FIG. 6 is a block diagram showing a configuration of a user terminal 20B (hereinafter, referred to as a "terminal 20B"), which is an example of the user terminal 20. In the present embodiment, the terminal 20B at least includes a specifying section 21, an organizing section 22, a displaying section 23B, a receiving section 24B, and a progress control section 25B.

The displaying section 23B has a function to display an image that includes a region by which a user is caused to recognize information regarding a recommended set thus organized and an input region configured so that an input from the user can be received. For example, the image is displayed by generating image information.

Here, the "input region" may be a region for receiving an input from the user, and its configuration is not limited particularly. It is preferable that the image is configured so that the region by which the user is caused to recognize the information regarding the recommended set thus organized becomes the input region. As one example of such a configuration, there are an icon for determining that the event is started using the recommended set and the like.

The receiving section 24B has a function to receive an input against an input region. An operational input against the input region corresponds to an operational input to cause an event to proceed using the recommended set.

The progress control section 25B has a function to control progress of the event on the basis of the recommended set.

Here, the word "progress of the event" means occurrence of various kinds of progress or changes and the like that can be generated in the event. As one example of the phrase "occurrence of various kinds of progress or changes and the like that can be generated in the event", there are progress of time, a change in a parameter of a game element, update of a specific status or a flag, or an operational input by the user, and the like.

Figure 7:
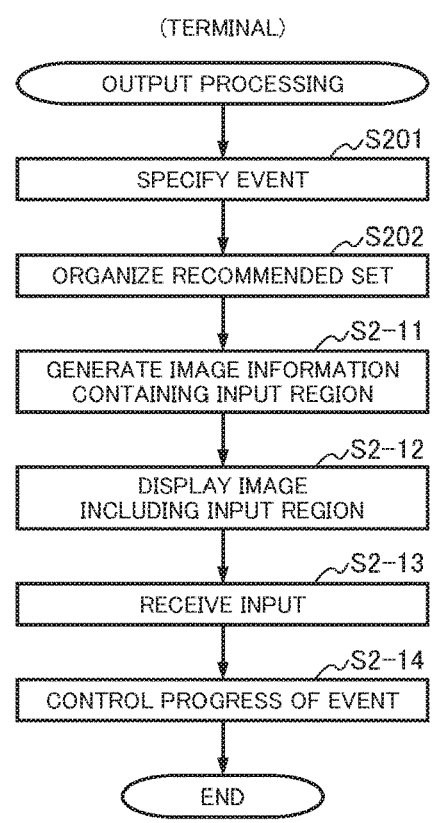
FIG. 7 is a flowchart showing an example of the output processing corresponding to at least one of the embodiments according to the present invention.

FIG. 7 is a flowchart showing an example of the output processing carried out by the terminal 20. Hereinafter, an operation of the terminal 20B will be described as an example. In this regard, an operation of the terminal 20B with the server is omitted from a point of view to avoid repeated explanation.

When a recommended set is organized (Step S202), the terminal 20B generates image information regarding an image that includes a region by which the user is caused to recognize the information regarding the recommended set thus organized and an input region (Step S2-11).

When the image information is generated, the terminal 20B causes a display device to display an image that includes a region by which the user is caused to recognize the information regarding the recommended set thus organized and an input region on the basis of the generated image information (Step S9-12).

When the image is displayed, the terminal 20B receives an input against the input region (Step S2-13).

When the input is received, the terminal 20B controls progress of an event on the basis of the recommended set (Step S2-14), and terminates the processing herein.

As explained above, as one side of the second embodiment, the user terminal 20B is configured so as to include the displaying section 23B, the receiving section 24B, and the progress control section 25B. Thus, the image including the region and the input region is displayed, the region causing the user to recognize the information regarding the recommended set thus organized, the input region being configured to receive the input from the user; the input against the input region is received; and the progress of the event is controlled on the basis of the recommended set. Therefore, it is possible to clarify an operation to organize a recommended set, and this makes it possible to reduce a load to create a set further.

Third Embodiment

Figure 8:
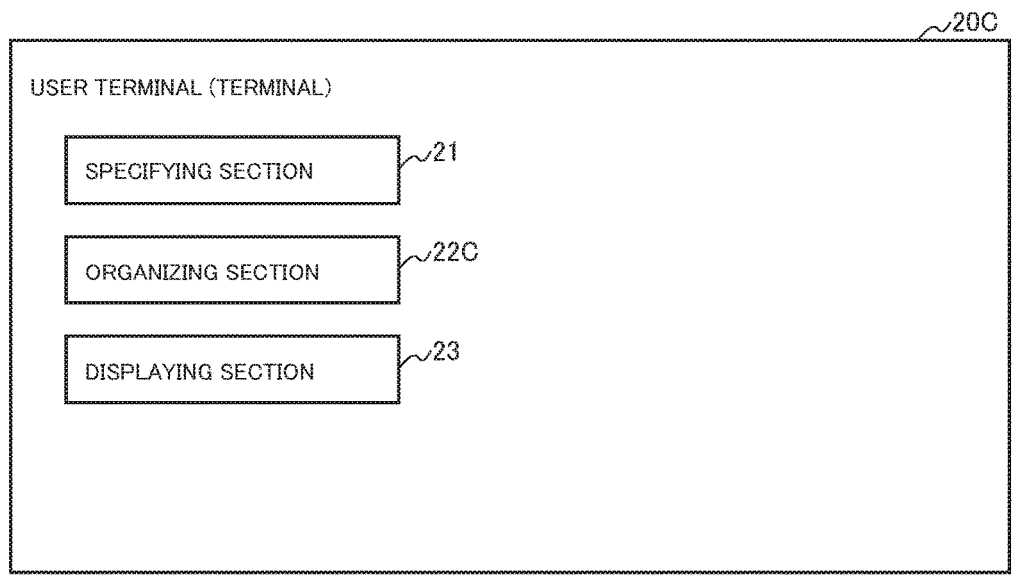
FIG. 8 is a block diagram showing a configuration of the user terminal corresponding to at least one of the embodiments according to the present invention.

FIG. 8 is a block diagram showing a configuration of a user terminal 20C (hereinafter, referred to as a "terminal 20C"), which is an example of the user terminal 20. In the present embodiment, the terminal 20C at least includes a specifying section 21, an organizing section 22C, and a displaying section 23.

The organizing section 22C has a function to organize a recommended set, which includes a game element configuration that becomes more advantageous than an enemy character appearing in an event, on the basis of a predetermined evaluation formula.

Here, the "predetermined evaluation formula" means a formula prepared in advance as a formula for evaluating a game element configuration. As an example of the predetermined evaluation formula, there is a formula for calculating a "strength value" that indicates strength of each of an enemy character and game elements. As an element to influence on the "strength value", for example, a "level value" is used. As one example of the evaluation formula, there are a formula "(strength value of enemy character)= (level value of enemy character) and the like.

Further, as one example to "become more advantageous", there is a state where by comparing a strength value of an enemy character with a value of sum of strength values of respective game elements constituting a group of game elements (hereinafter, referred to as a "total value"), the total value becomes the strength value of the enemy character or higher. In this case, as one example of the evaluation formula, there are a formula "(total value)≥(strength value of enemy character)" and the like.

Figure 9:
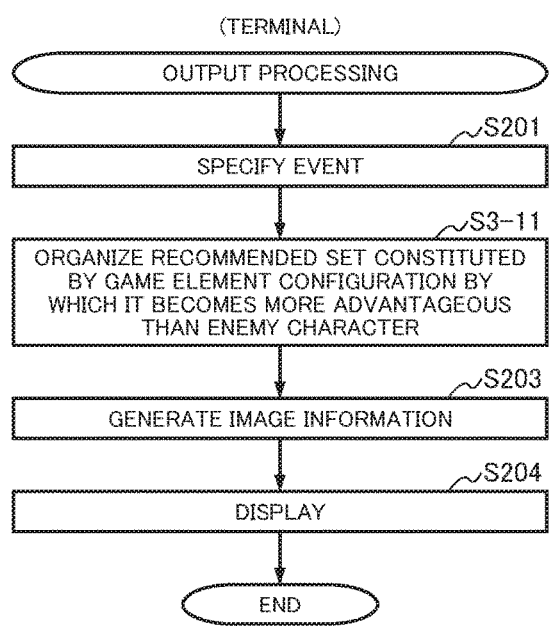
FIG. 9 is a flowchart showing an example of the output processing corresponding to at least one of the embodiments according to the present invention.

FIG. 9 is a flowchart showing an example of the output processing carried out by the terminal 20. Hereinafter, an operation of the terminal 20C will be described as an example. In this regard, description of an operation of the terminal 20C together with the server 10 is omitted from a point of view to avoid repeated explanation.

When an event is specified (Step S201), the terminal 20C organizes a recommended set, which includes a game element configuration that becomes more advantageous than an enemy character appearing in an event, on the basis of a predetermined evaluation formula (Step S3-11). In the present embodiment, the terminal 20C refers to information on the enemy character that appears in the specified event, and organizes, as the recommended set, a game element configuration that becomes the total value, which is the strength value of the enemy character or more.

As explained above, as one side of the third embodiment, the user terminal 20C is configured so as to include the organizing section 22C. Thus, the recommended set, which is constituted by the game element configuration to become more advantageous than the enemy character that appears in the event, is organized on the basis of the predetermined evaluation formula. Therefore, it is possible to reduce a load to create a set.

In this regard, it has not been mentioned particularly in the example of the third embodiment described above. However, the predetermined evaluation formula may be a formula for calculating the strength value of the enemy character by referring to a parameter set up for the enemy character (for example, calculated from a level value and a characteristic of a character; which includes an offensive power, an HP, a defensive power and the like). In this case, it is preferable that the game element is similarly configured so as to calculate the total value by referring to a parameter set up for the game element to calculate a strength value of each of the game elements constituting a group of game elements.

Fourth Embodiment

Figure 10:
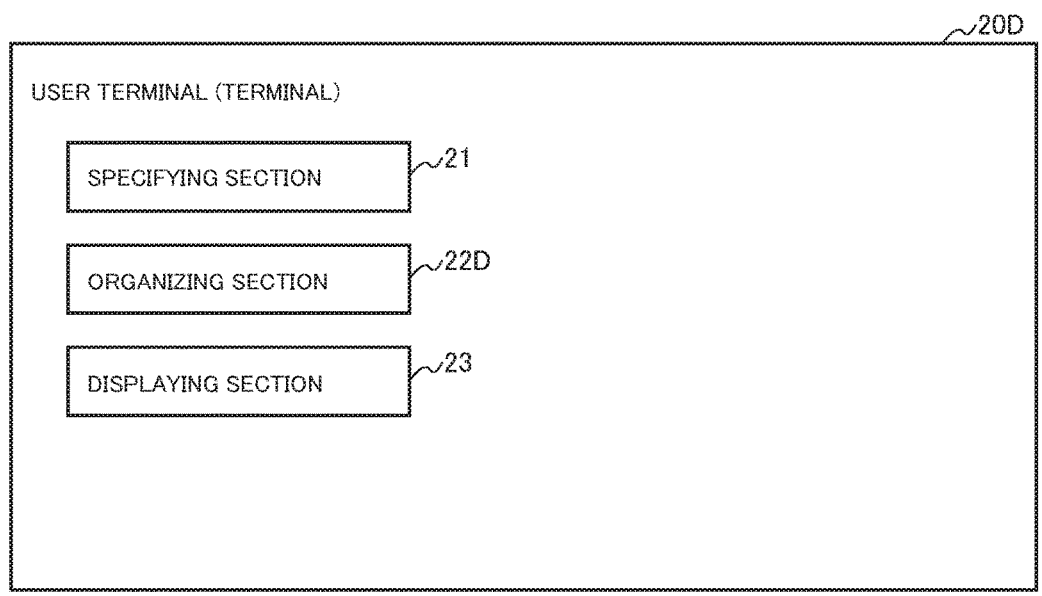
FIG. 10 is a block diagram showing a configuration of the user terminal corresponding to at least one of the embodiments according to the present invention.

FIG. 10 is a block diagram showing a configuration of a user terminal 20D (hereinafter, referred to as a "terminal 20D"), which is an example of the user terminal 20. In the present embodiment, the terminal 20D at least includes a specifying section 21, an organizing section 22D, and a displaying section 23.

The organizing section 22D has a function to organize a recommended set in which information regarding a play level value of a game element (or each of game elements) constituting the recommended set (hereinafter, referred to also as a "level value") and information regarding a play level value set up to an event are constituted by a game element configuration that satisfies a predetermined same-level condition.

Here, the "predetermined same-level condition" is a condition meaning that they are substantially the same. Namely, the phrase "organize a recommended set constituted by a game element configuration that satisfies the predetermined same-level condition" means organizing a recommended set so that a comparison target is regarded as the same degree. Here, ones set up as the comparison target include the information regarding the play level value of each of the game elements constituting the recommended set and the information regarding the play level value set up to the event. In this regard, it is preferable that the terminal 20D is configured so that a sum of the play level values of the respective game elements constituting the set and the level value of the enemy character become a comparison target. Otherwise, for example, the terminal 20D may be configured so that the play level value of each of the game elements constituting the set and the level value of the enemy character become a comparison target.

The "information regarding a play level value set up to an event" may be information set up to the event itself, or information regarding the play level value of the enemy character that appears in the event.

Figure 11:
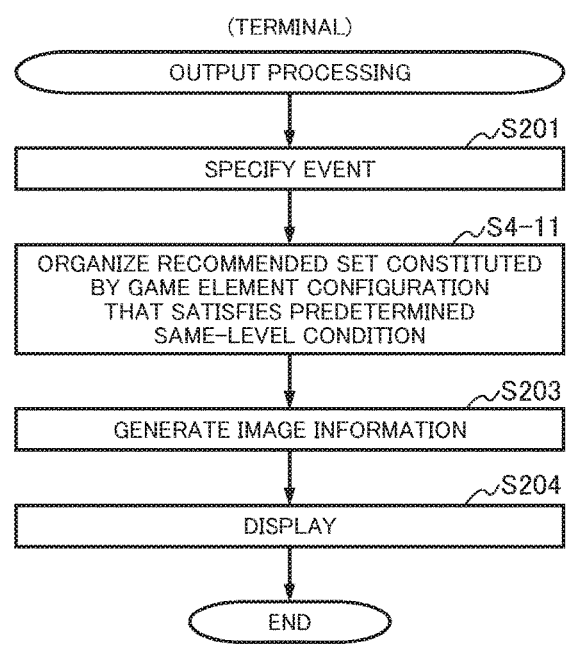
FIG. 11 is a flowchart showing an example of the output processing corresponding to at least one of the embodiments according to the present invention.

FIG. 11 is a flowchart showing an example of the output processing carried out by the terminal 20. Hereinafter, an operation of the terminal 20D will be described as an example. In this regard, description of an operation of the terminal 20D together with the server 10 is omitted from a point of view to avoid repeated explanation.

When the event is specified (Step S201), the terminal 20D organizes a recommended set constituted by a game element configuration in which information regarding a play level value of each of game elements constituting the recommended set and information regarding a play level value set up to an event satisfy a predetermined same-level condition (Step S4-11).

As explained above, as one side of the fourth embodiment, the user terminal 20D is configured so as to include the organizing section 22D. Thus, the recommended set constituted by the game element configuration in which both the information regarding the play level value of each of the game elements constituting the recommended set and the information regarding the play level value set up to the event satisfy the predetermined same-level condition is organized. Therefore, it is possible to reduce a load to create a set further.

Fifth Embodiment

Figure 12:
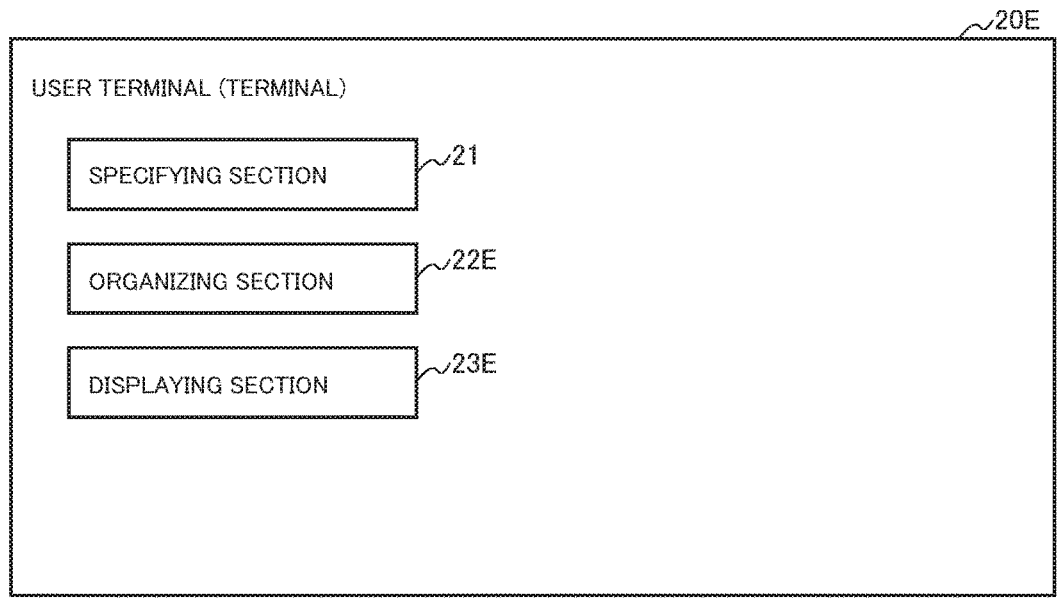
FIG. 12 is a block diagram showing a configuration of the user terminal corresponding to at least one of the embodiments according to the present invention.

FIG. 12 is a block diagram showing a configuration of a user terminal 20E (hereinafter, referred to as a "terminal 20E"), which is an example of the user terminal 20. In the present embodiment, the terminal 20E at least includes a specifying section 21, an organizing section 22E, and a displaying section 23E.

The organizing section 22E has a function to organize a set, which is constituted by the strongest game element configuration among game elements owned by the user (hereinafter, referred to as a "strongest set").

Here, the word "strongest" denotes that it is theoretically the strongest one, but it shall not necessarily exclude a state other stronger set exists.

In the present embodiment, in order to specify the strongest game element configuration theoretically, a predetermined second evaluation formula is used. Here, as one example of the predetermined second evaluation formula, only the game elements owned by the user are considered. As a more concrete example, there is a formula for calculating a strength value from a parameter set up to each of the game elements owned by the user. The organizing section 22E uses such a formula to calculate the strength value of each of the game elements owned by the user, and specifies game elements of the predetermined number, which constitute a group of game elements, each having an upper strength value among the calculated strength values. The organizing section 22E then organizes the strongest set of game element configurations, which is constituted by the specified game element.

The displaying section 23E has a function to cause a display device included in the user terminal to display an image by which the user is caused to recognize information regarding the recommended set and information regarding the strongest set.

Figure 13:
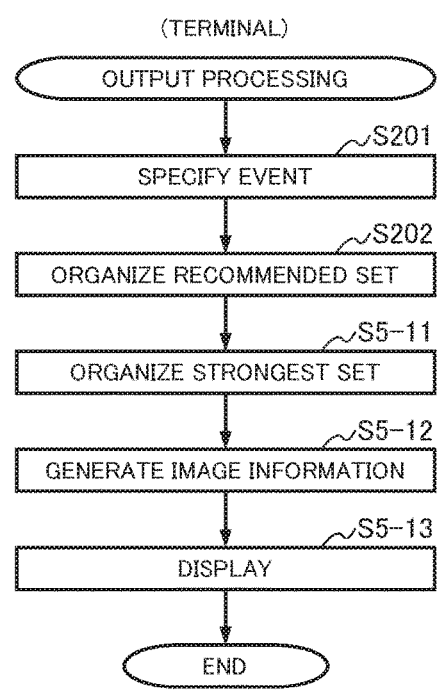
FIG. 13 is a flowchart showing an example of the output processing corresponding to at least one of the embodiments according to the present invention.

FIG. 13 is a flowchart showing an example of the output processing carried out by the terminal 20. Hereinafter, an operation of the terminal 20E will be described as an example. In this regard, an operation of the terminal 20E with the server is omitted from a point of view to avoid repeated explanation.

When a recommended set is organized (Step S202), the terminal 20E organizes the strongest set (Step S5-11).

When the strongest set is organized, the terminal 20E generates image information for causing the display device included in the user terminal 20E to display an image by which the user is caused to recognize information regarding the recommended set and information regarding the strongest set (Step S5-12).

Subsequently, the terminal 20E causes the display device to display the image by which the user is caused to recognize the information regarding the recommended set and the information regarding the strongest set on the basis of the image information (Step S5-13), and terminates the processing herein.

As explained above, as one side of the fifth embodiment, the user terminal 20E is configured so as to include the organizing section 22E and the displaying section 23E. Thus, the set constituted by the strongest game element configuration from the game elements owned by the user is organized, and the display device included in the user terminal is caused to display the image by which the user is caused to recognize the information regarding the recommended set and the information regarding the strongest. Therefore, it is possible to further reduce a load to create a set.

Namely, as one side of the fifth embodiment, the information regarding the set constituted by the game element configuration that is created on the basis of two kinds of different evaluation criteria, which include the recommended set and the strongest set, is presented to the user. For this reason, it becomes possible to organize a set according to each situation easily, and this makes it possible to further reduce a load to create a set.

Sixth Embodiment

In the sixth embodiment, an example of a video game in the present system will be described in detail.

(Outline of Video Game)

A video game according to the present embodiment is one in which a deck including at least one game element (that is, an arcana) that is owned by a user is organized, and a battle (or a fight) against an enemy character is then carried out. When various kinds of events are displayed on a display screen of a user terminal and the user carries out a selection operation for an event, an enemy character corresponding to the event is displayed. The user carries out a battle against the enemy character by organizing a deck.

(Outline of Arcana and Enemy Character)

Each of game elements owned by the user is referred to as an "arcana". A parameter is set up to each of the arcanas. A level value, an offensive power, a defensive power, an HP, and the like are contained in the parameter of the arcana. Similarly, a parameter is also set up to an enemy character. A level value, an offensive power, a defensive power, an HP, and the like are also contained in the parameter of the enemy character. Further, various kinds of parameters such as a preperceptive power (or a predictive power) is set up to a user character itself in addition to the arcanas constituting the deck. Hereinafter, in order to clearly distinguish them, explanation will be made by using the user, the user character, the arcana, and the enemy character differently.

(Flow of Battle)

As a flow of a battle, the user first selects an event. An enemy character corresponding to the selected event appears and is displayed on a display screen. After the enemy character is displayed, an image in which a plurality of arcanas owned by the user is selected to organize a deck is displayed on the display screen. When the deck is determined by an input of the user, an event (here, a fight against the enemy character) is started. The battle is a turn-by-turn battle. One round is constituted by a turn of the user (that is, a user phase) and a turn of the enemy character (that is, an enemy phase), and rounds are repeated until the battle is terminated. In the round, the user terminal refers to parameters of the characters to determine an action order of the arcana and the enemy character. In a case where the HP of the enemy character becomes "0 (zero)", the battle is terminated as victory of the user. On the other hand, in a case where all HPs of the arcanas of the user side become "0" before the HP of the enemy character becomes "0", the battle (that is, the fight) is terminated as defeat of the user.

(Configuration of Deck)

Figure 14:
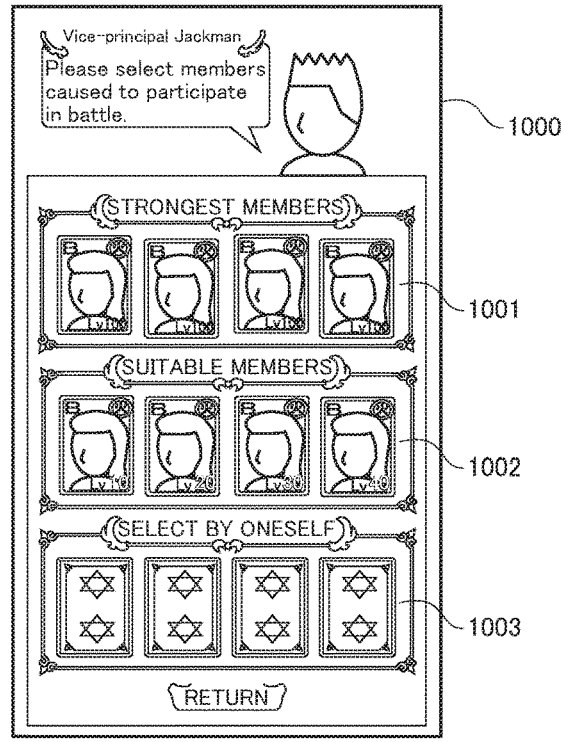
FIG. 14 is an explanatory drawing for explaining an example of a display screen corresponding to at least one of the embodiments according to the present invention.

A user constitutes a deck in a case where an enemy character is displayed. FIG. 14 is an explanatory drawing for explaining an example of the display screen for organizing a deck. As shown in FIG. 14, the deck can be organized by a plurality of patterns. A first input region 1001 in which a deck constituted by the strongest members (hereinafter, referred to the "strongest set") is displayed, a second input region 1002 in which a deck constituted by suitable members (hereinafter, referred to a "recommended set") is displayed, and a third input region 1003 indicating that the user selects by himself or herself are included in a display screen 1000. A set of arcana configuration having the strongest arcanas of the arcanas owned by the user is displayed in the first input region 1001. When an operational input against the first input region 1001 is received, the battle can be carried out by the deck constituted by the arcanas displayed in the first input region 1001 (that is, the strongest set). Further, a set of arcana configuration that is recommended in accordance with strength of the enemy character is displayed in the second input region 1002. When an operational input against the second input region 1002 is received, the battle can be carried out by the deck constituted by the arcanas recommended in accordance with the strength of the enemy character (that is, a recommended set). On the other hand, when an operational input against the third input region 1003 is received, the display screen transitions to a screen in which the arcanas owned by the user are displayed in a list. The user is allowed to select arcanas constituting a deck one by one in the transitioned screen, and the battle can be carried out by the selected arcana configuration.

(Configuration of Recommended Deck)

As described above, a recommended deck is a deck of an arcana configuration according to strength of an enemy character. As an example for organizing the recommended deck, by quantifying the strength of each of the arcanas owned by the user and the strength of the enemy character using a predetermined evaluation formula, a deck constituted by the arcanas each of which theoretically has slightly stronger than the strength of the enemy character is organized. Namely, because of a theoretical manner, in a case where a battle is carried out by the recommended deck, the enemy character is stronger than the deck and the battle may be terminated as defeat of the user. Although a concrete formula will not be described, the predetermined evaluation formula used herein is a formula using various kinds of parameters, such as a level value and an offensive power set up for the character, for example.

(Outline of Game Image During Battle)

Figure 15:
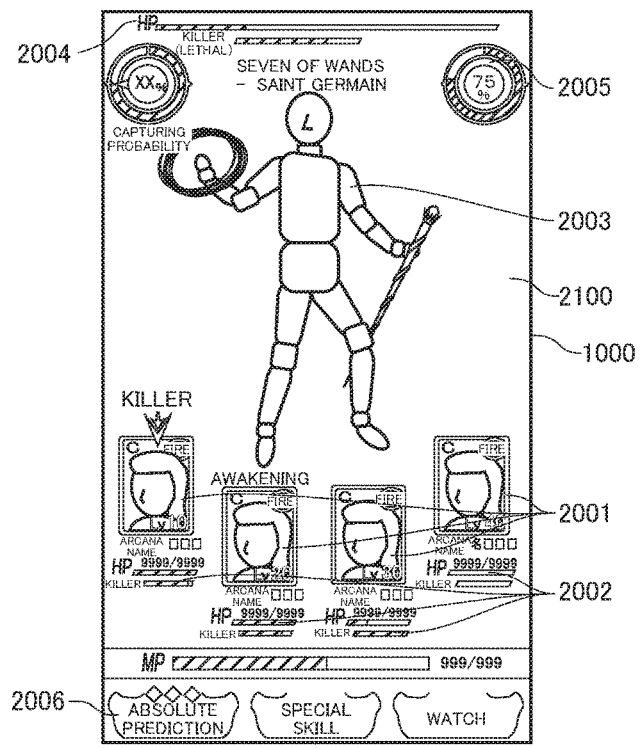
FIG. 15 is an explanatory drawing for explaining an example of a display screen corresponding to at least one of the embodiments according to the present invention.

FIG. 15 is an explanatory drawing for explaining an example of the display screen for displaying a game image during a battle. As shown in FIG. 15, a game image 2100 during a battle, which includes arcanas 2001 constituting a deck, a status 2002 of each of arcanas, an enemy character 2003, a status 2004 of an enemy character, a victory probability icon 2005, and a prediction (or preperception) button 2006 by which the user can know subsequent development of the battle, is displayed in a display screen 1000.

(Game Image 1 During Battle)

As shown in FIG. 15, the status 2002 of the arcana is contained in the vicinity of each of the arcanas 2001 in the game image 2100 during the battle. The status 2002 of each of the arcanas is subtracted by an action of the enemy character 2003. Although it is not shown in the drawings particularly, the arcana whose HP becomes 0, a display form thereof is changed into a display form by which the user is caused to recognize that the HP thereof is 0. In a case where the HPs of all arcanas become zero, the battle is terminated as defeat of the user.

(Game Image 2 During Battle)

As shown in FIG. 15, the enemy character 2003 is contained at the center of the image in the game image 2100 during the battle. Further, as shown in FIG. 15, the status 2004 of the enemy character is displayed above the enemy character. In a case where the HP of the enemy character becomes "0", the battle is terminated as victory of the user.

(Game Image 3 During Battle)

Figure 16:
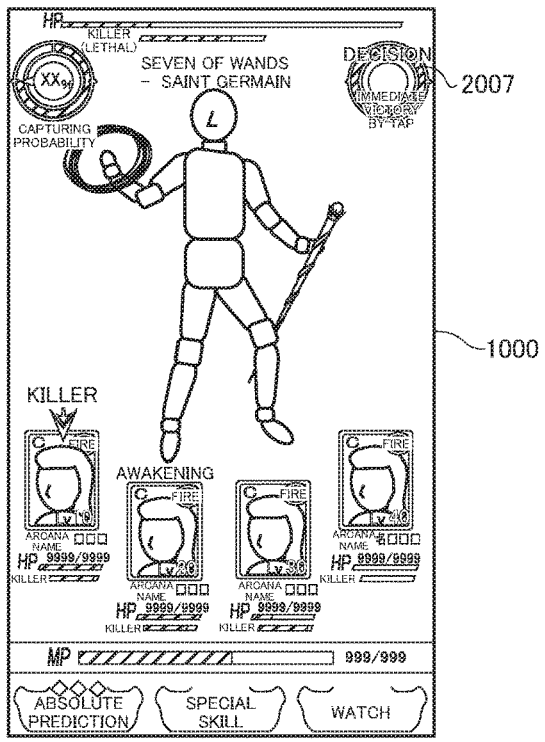
FIG. 16 is an explanatory drawing for explaining an example of a display screen corresponding to at least one of the embodiments according to the present invention.

As shown in FIG. 15, the victory probability icon 2005 is contained in the game image during the battle. A victory probability mentioned herein is displayed as information calculated on the basis of a predetermined calculation formula. However, the victory probability herein is not a victory probability in a strict sense, but is information corresponding to progress of the video game. When it is calculated that the victory probability is 100% on the basis of the predetermined calculation formula, the victory probability icon 2005 is highlighted, and becomes an icon for which an operational input is available. FIG. 16 is an explanatory drawing for explaining an example of the display screen showing that a victory probability icon is highlighted. As shown in FIG. 16, a display form of the victory probability icon 2005 is changed into that of a victory probability icon 2007 indicating decision. In this regard, it has not been shown in FIG. 16 particularly. However, the display form of the victory probability icon 2007 indicating decision has a different color from that of the victory probability icon 2005. Here, when an operational input (for example, a tap input) against the victory probability icon 2007 is received from the user, the battle is terminated, and victory of the user is decided. In this regard, in the present embodiment, battle progress is displayed on the display screen 1000 in a fast forwarding manner until the battle is terminated. The user terminal is configured so that an input from the user is not received while the battle progress is displayed. In this regard, it has not been shown in FIG. 15 particularly. However, in a case where it is calculated that the victory probability is not 100%, an "escape icon" is displayed in the vicinity of the victory probability icon. When an operational input against the "escape icon" is received, the battle is terminated without determining victory or defeat.

(Game Image 4 During Battle)

As shown in FIG. 15, the prediction button 2006 capable of receiving an operational input from the user is contained. An operational input against the prediction button 2006 causes the user to make a prediction (or a preperception) for a next action of the enemy character. Here, the prediction means that the user knew in advance. Namely, the user can know what action the enemy character carries out. In this regard, this predicted action is not necessarily carried out with the probability of 100%. A probability that the predicted action is carried out varies in accordance with a progress status of the video game. Here, a prediction that the predicted action is carried out with the probability of 100% is referred to as an "absolute prediction". On the other hand, a prediction that the predicted action is not necessarily carried out with the probability of 100% is referred to as an "automatic prediction". The "absolute prediction" and the "automatic prediction" will be described later in detail.

(As for Calculation of Victory Probability)

As described above, as shown in FIG. 15 or FIG. 16, the victory probability icon 2005 or the victory probability icon 2007 regarding the calculated victory probability is displayed in an image during a battle on the basis of the predetermined calculation formula. In the present embodiment, in order to calculate a victory probability, at the start of a round, the user terminal does not receive any operational input from the user (or assuming that the user terminal receives a predetermined operational input at predetermined timing), but prefetches a result of the battle when the predetermined number of turns elapses. More specifically, at the start of the round, the user terminal automatically causes the arcanas of the user and the enemy character to act on the basis of a "predetermined action rule" until 30 turns are carried out, and internally calculates (or prefetches) a battle result after the 30 turns. In a case where a calculation result that an HP of the enemy character becomes "0" is obtained, the victory probability icon 2007 indicating that the victory probability is 100% is displayed as shown in FIG. 16. On the other hand, in a case where the calculation result that the HP of the enemy character becomes "0" is not obtained, the victory probability icon 2005 indicating a percentage calculated on the basis of a rate of a current HP of the enemy character and the maximum value of the HP of the enemy character is displayed as shown in FIG. 15. Namely, the victory probability icon 2005 does not express the "victory probability" in the strict sense, but expresses how the HP of the enemy character reduces at the present state.

(Skip of Battle)

The victory probability icon 2007 has a function as a region to cause the user to recognize the victory probability and to receive an instruction to skip a battle from the user. In the present embodiment, when an input against the victory probability icon 2007 is received from the user, the battle is terminated as victory of the user. Namely, the video game proceeds so that the battle is skipped, and the user can win the battle without requiring a particular operation. In this case, the user terminal may be configured so that the video game according to the present embodiment transitions to a battle result suddenly. Further, when an input against the victory probability icon 2007 is received from the user, then the user terminal does not receive any input from the user until a battle result is displayed (that is, while a battle progress until the battle result is displayed is displayed). Here, the battle progress and the battle result to be displayed is displayed on the basis of calculation information when to internally calculate a battle result at 30 turns future.

(Absolute Prediction)

A usage right of an "absolute prediction" is given to the user with a probability by referring to a "preperceptive power" included in user parameters. The user to which the usage right of the "absolute prediction" carries out an operational input (for example, tap input) against the "absolute prediction icon 2006" displayed on a screen, whereby the user is allowed to use the "absolute prediction". The "absolute prediction" can be used in a "phase for the user". The probability that the usage right of the "absolute prediction" is given is set to be lower than a probability that a usage right of the "automatic prediction" is given.

(Automatic Prediction)

The usage right of the "automatic prediction" is given to the user with a probability by referring to the "preperceptive power" included in the user parameters. In a case where the usage right of the "absolute prediction" is given to the user, the "automatic prediction" is not given to the user. Further, unlike the "absolute prediction", the predicted action is not necessarily carried out. Namely, a hit ratio (or a predictive ratio) of the automatic prediction is not necessarily 100%. The probability that the predicted action is carried out is calculated on the basis of a predetermined calculation formula from the "preperceptive power" included in the user parameters and other factors. Although a concrete calculation formula will not be described, a calculation formula so as to fall into a range of about 50% to 100% is used.

(At Time of Victory of Battle)

Figure 17:
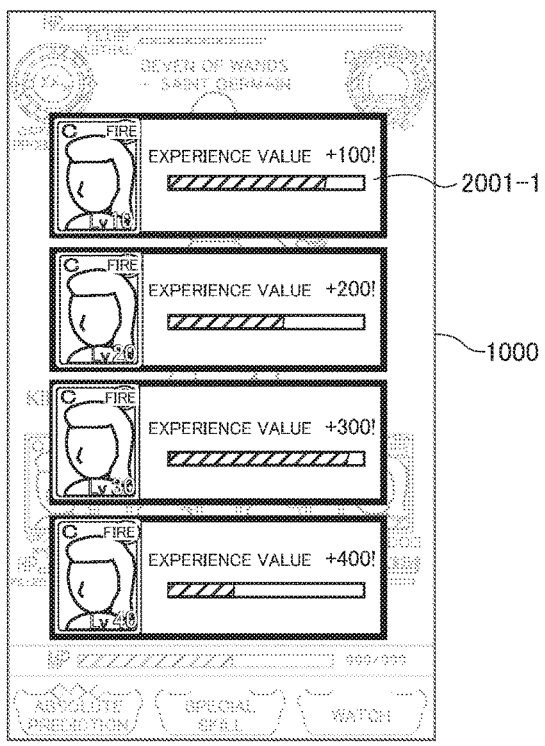
FIG. 17 is an explanatory drawing for explaining an example of a display screen corresponding to at least one of the embodiments according to the present invention.

When the user wins a battle, a display screen transitions to a victory screen. FIG. 17 is an explanatory drawing for explaining an example of the victory screen. As shown in FIG. 17, an experience value is given to each of the arcanas. Namely, the experience value is given to each of the arcanas of the user who participates in the battle on the basis of an experience value associated with the enemy character (hereinafter, referred to as a "basic experience value"). More specifically, by distributing the basic experience value to the respective arcanas, each of the arcanas obtains the experience value. A rate of the experience value to be given to one arcana becomes a rate of a level value of the one arcana to a total level value of the respective arcanas that participate in the battle. As shown in FIG. 17, in a case where a level of an arcana 2001-1 that participates in a battle is "10" and a total level value of the respective arcanas that participate in the battle is "100", a rate of an experience value to be given to the arcana 2001-1 becomes 10%. For example, in a case where a basic experience value associated with the enemy character is "1000", an experience value of "100" is given to the arcana 2001-1 as shown in FIG. 17.

Figure 18:
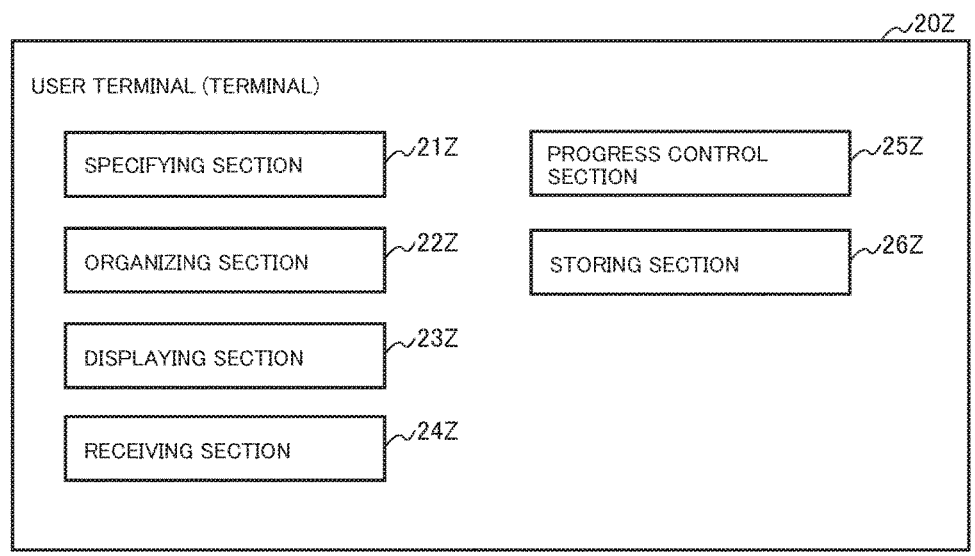
FIG. 18 is a block diagram showing a configuration of the user terminal corresponding to at least one of the embodiments according to the present invention.

FIG. 18 is a block diagram showing a configuration of a user terminal 20Z (hereinafter, referred to as a "the terminal 20Z"), which is an example of the user terminal 20 in the system 100 (see FIG. 1).

In the present embodiment, the terminal 20Z at least includes a specifying section 21Z, an organizing section 22Z, a displaying section 23Z, a receiving section 24Z, a progress control section 25Z, and a storing section 26Z.

The specifying section 21Z has a function to specify an event selected by the user. More specifically, the specifying section 21Z receives a selection input against an event list screen displayed on a display screen from the user. Further, the specifying section 21Z refers to a predetermined storage region (for example, the storing section 26Z) to specify an enemy character that appears in the event. As one of concrete examples, the specifying section 21Z specifies a "strength value" of the enemy character that appears in the event.

The organizing section 22Z has a function to refer to information regarding an enemy character that appears in an event (that is, refer to the event) to organize a set (hereinafter, referred to as a "recommended set"), which includes a game element configuration that becomes more advantageous than the enemy character that appears in the event, on the basis of a predetermined evaluation formula. Moreover, the organizing section 22Z has a function to organize a set (hereinafter, referred to as "the strongest set"), which includes the strongest game element configuration among game elements owned by the user.

Here, the "predetermined evaluation formula" includes a formula for calculating a "strength value" indicating strength of the enemy character or strength of each of the game elements, for example. As an element that influences on the "strength value", a "level value" is used, for example. As one example of the evaluation formula, there are a formula "(strength value of enemy character)−(level value of enemy character) and the like. More specifically, in a case where the level of the enemy character is "100", the strength value becomes "100".

Further, as one example of the phrase "become more advantageous", the strength value of the enemy character is compared with a sum of values of the respective strength values of the game elements constituting a group of game elements (hereinafter, referred to as a "total value"), and the total value becomes the strength value of the enemy character or more. For example, as shown in FIG. 14, in a case where a strength value of an enemy character is "100", a recommended set 1002 with a game element configuration constituted by a game element whose level value is "10" (that is, a strength value thereof is "10"), a game element whose level value is "20" (that is, a strength value thereof is "20"), a game element whose level value is "30" (that is, a strength value thereof is "30"), and a game element whose level value is "40" (that is, a strength value thereof is "40") is organized, and the second input region 1002 is then displayed on the display screen 1000.

Further, the word "strongest" denotes that it is theoretically the strongest one, but it shall not necessarily exclude a state that other stronger set exists. For example, in a case where the user owns four game elements each of which having the highest level "100", as shown in FIG. 14, the strongest set of the game element configuration constituted by four game elements each of which has a level of "100" is organized, and the first input region 1001 is displayed on the display screen 1000.

As shown in FIG. 14, the displaying section 23Z has a function to carry out processing to cause a display device included in the user terminal to display an image containing the first input region 1001 for receiving an instruction to cause an event to proceed using the strongest set, by which the user is caused to recognize information regarding the strongest set, and the second input region 1002 for receiving an instruction to cause the event to proceed using the recommended set, by which the user is caused to recognize information regarding the recommended set.

The receiving section 24Z has a function to receive an input against various kinds of input regions (for example, the first input region 1001, the second input region 1002 and the like). An operational input against the first input region 1001 corresponds to an operational input to cause an event to proceed by using a recommended set. An operational input against the second input region 1002 corresponds to an operational input to cause an event by using the strongest set.

The progress control section 25Z has a function to control progress of the event by using the game element configuration according to the operational input received from the user.

The storing section 26Z is a storage medium for storing various kinds of information that is to be used for progress of the video game. Although it is not shown in the drawings particularly, user information, event information, and the like are stored in the storing section 26Z. A user ID for uniquely specifying a user, information regarding game elements owned by the user, information regarding various kinds of parameters respectively set to the game elements owned by the user, and the like are contained in the user information. Further, an event ID for uniquely specifying an event, information regarding various kinds of parameters set to an enemy character that appears in the event, information regarding privilege associated with the enemy character, and the like are contained in the event information.

Figure 19:
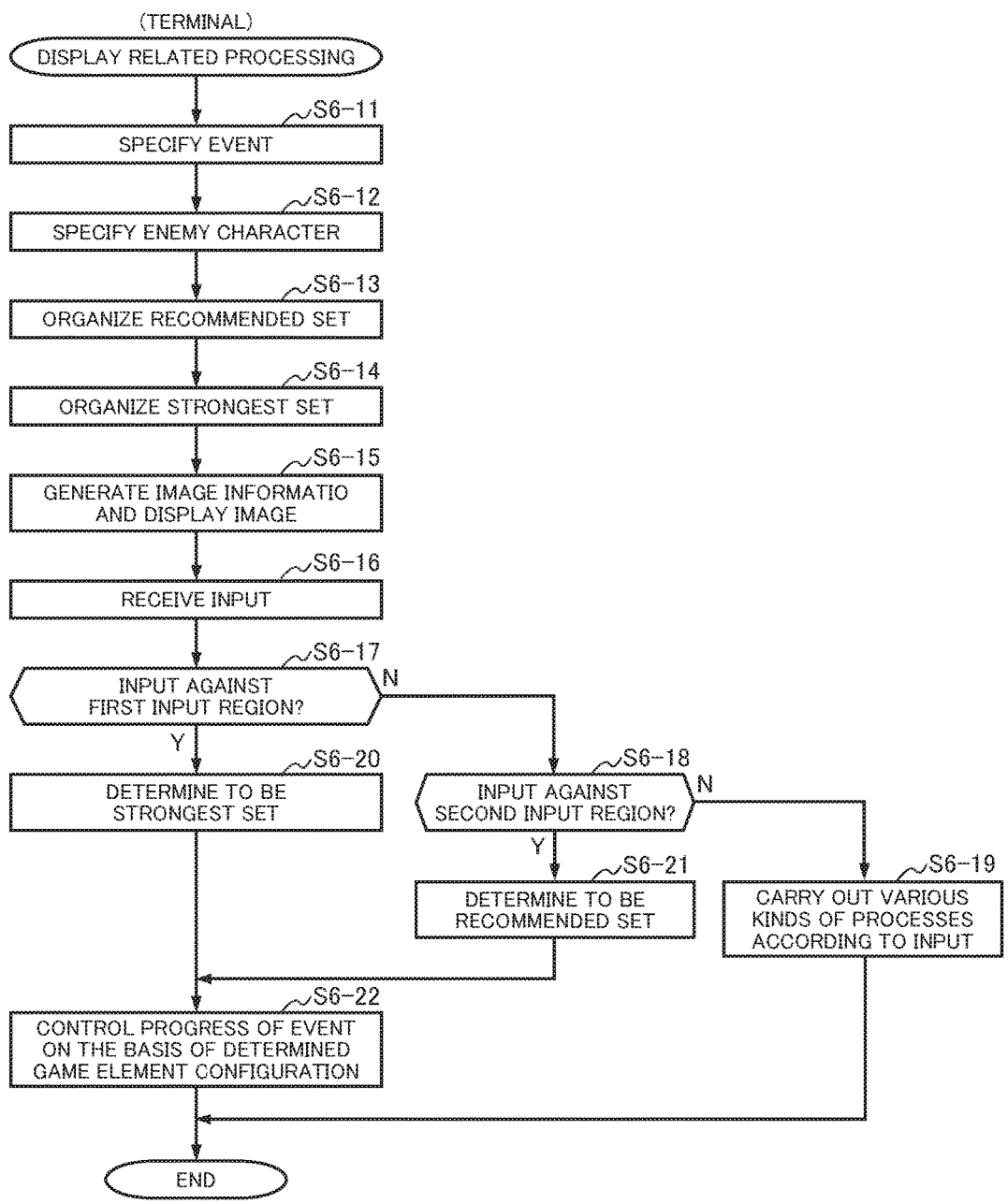
FIG. 19 is a flowchart showing an example of display related processing corresponding to at least one of the embodiments according to the present invention.

FIG. 19 is a flowchart showing an example of processing regarding display (hereinafter, referred to as "display related processing"), which is to be carried out by the terminal 20. Hereinafter, an operation of the terminal 20Z will be described as an example. In this regard, description of an operation of the terminal 20Z together with the server 10 is omitted from a point of view to avoid repeated explanation.

In the display related processing, processes to determine a game element configuration for using an event and cause an event to proceed with the determined game element configuration are carried out.

In the display related processing, the terminal 20Z first specifies an event selected by the user (Step S6-11).

When the event is specified, the terminal 20Z specifies an enemy character that appears in the specified event (Step S6-12).

When the enemy character is specified, the terminal 20Z organizes, on the basis of the predetermined evaluation formula, a recommended set, which includes a game element configuration that becomes more advantageous than an enemy character (Step S6-13).

When the recommended set is organized, the terminal 20Z further organizes the strongest set on the basis of a predetermined second evaluation formula. The strongest set is constituted by the strongest game element configuration among the game elements owned by the user (Step S6-14).

When the strongest set is organized, the terminal 20Z generates image information, and causes the display device to display an image on the display screen 1000 on the basis of the image information (Step S6-15). As shown in FIG. 14, the image, which includes a region for causing the user to recognize the recommended set, the second input region 1002 for receiving an instruction to cause the event to proceed using the recommended set, a region for causing the user to recognize the strongest set, and the first input region 1001 for receiving an instruction to cause the event to proceed using the strongest set, is displayed on the display screen 1000.

Subsequently, the terminal 20Z receives an input against any of the input regions (Step S6-16), and determines whether the received input is an input against the first input region 1001 or an input against the second input region 1002. As one example of the processing, the terminal 20Z determines whether the received input is the input against the first input region 1001 or not (Step S6-17). In a case where it is determined that the received input is not the input against the first input region 1001 ("No" at Step S6-17), the terminal 20Z then determines whether the received input is the input against the second input region 1002 or not (Step S6-18). In a case where it is determined that the received input is not the input against the second input region 1002 (Step S6-18), the terminal 20Z carries out various kinds of processes according to the input (Step S6-19), and terminates the processing herein. Description of details of the various kinds of processes will be omitted herein particularly.

In a case where it is determined that the received input is the input against the first input region 1001 ("Yes" at Step S6-17), the terminal 20Z determines that the game element configuration using the event is set to the strongest set (Step S6-20).

On the other hand, it is determined that the received input is the input against the second input region 1002 ("Yes" at Step S6-18), the terminal 20Z determines that the game element configuration using the event is set to the recommended set (Step S6-21).

When the game element configuration used in the event is determined, the terminal 20Z controls progress of the event on the basis of the determined game element configuration (Step S6-22), and terminates the processing herein.

As explained above, as one side of the sixth embodiment, a computer (the user terminal 20Z) for controlling progress of the video game in which the set constituted by at least one game element owned by the user is configured so as to at least include the specifying section 21Z, the organizing section 22Z, and the displaying section 23Z. Thus, the event to be carried out by the user is specified; by referring to the event, the recommended set constituted by the game element configuration that satisfies the predetermined condition is organized; and the display device included in the user terminal is caused to display the image by which the user is caused to recognize the information regarding the recommended set. Therefore, it becomes possible to reduce a load to create a set.

Further, as one side of the sixth embodiment described above, the terminal 20Z is configured so as to further include the receiving section 24Z and the progress control section 25Z. Thus, the display device is caused to display the image that includes the region by which the user is caused to recognize the information regarding the recommended set thus organized and the input region configured so that an input from the user can be received; an input against the input region is received; and progress of the event is controlled on the basis of the recommended set. Therefore, it is possible to clarify an operation to organize a recommended set, and this makes it possible to further reduce a load to create a set.

Further, as one side of the sixth embodiment described above, the terminal 20Z is configured so as to include the organizing section 22Z. Thus, the recommended set constituted by the game element configuration that becomes more advantageous than the enemy character appearing in the event is organized on the basis of the predetermined evaluation formula. Therefore, it is possible to further reduce a load to create a set.

Further, as one side of the sixth embodiment described above, the terminal 20Z is configured so as to include the organizing section 22Z. Thus, the recommended set constituted by the game element configuration is organized on the basis of the predetermined evaluation formula, in which the game element configuration becomes more advantageous than the enemy character that appears in the event. Therefore, it is possible to reduce a load to create a set further.

Further, as one side of the sixth embodiment described above, the terminal 20Z is configured so as to include the organizing section 22Z and the displaying section 23Z. Thus, the set constituted by the strongest game element configuration among the game elements owned by the user is organized, and the display device included in the user terminal is caused to display the image by which the user is caused to recognize the information regarding the recommended set and the information regarding the strongest set. Therefore, it is possible to reduce a load to create a set further.

As explained above, one or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, 201 to 20N and the server 10 carries out the various kinds of processing described above in accordance with various kinds of control programs (for example, a video game processing program) stored in the storage device with which the corresponding terminal or server is provided.

Further, the configuration of the system 100 is not limited to the configuration that has been explained as an example of each of the embodiments described above. For example, the system 100 may be configured so that the server 10 carries out a part or all of the processes that have been explained as the processes carried out by the user terminal. Alternatively, the system 100 may be configured so that any of the plurality of user terminals 20, 201 to 20N (for example, the user terminal 20) carries out a part or all of the processes that have been explained as the processes carried out by the server 10. Further, the system 100 may be configured so that a part or all of the storing sections included in the server 10 is included in any of the plurality of user terminals 20, 201 to 20N. Namely, the system 100 may be configured so that a part or all of the functions of any one of the user terminal 20 and the server 10 according to the system 100 is included in the other.

Further, the program product may be configured so as to cause a single apparatus that does not include a communication network to realize a part or all of the functions that have been explained as the examples of the respective embodiments described above.

APPENDIX

The explanation of the embodiments described above has been described so that the following inventions can be at least realized by a person having a normal skill in the art to which the present invention belongs.

(1)

A non-transitory computer-readable medium including a program product for causing a user terminal to realize functions to control progress of a video game, a set constituted by at least one game element being used in the video game, a user owning the at least one game element, wherein the functions include:

a specifying function configured to specify an event to be carried out by the user;

an organizing function configured to refer to the event to organize a recommended set, the recommended set being constituted by a game element configuration that satisfies a predetermined condition; and a displaying function configured to display an image, the image causing the user to recognize information regarding the recommended set organized by the organizing function.

(2)

The non-transitory computer-readable medium according to claim (1), wherein the displaying function further includes a function configured to display an image including a region and an input region, the user being caused to recognize the information regarding the recommended set thus organized by means of the region, the input region being configured to receive an input from the user, and wherein the functions further include:

a receiving function configured to receive an input against the input region; and a progress controlling function configured to control progress of the event on the basis of the recommended set.

(3)

The non-transitory computer-readable medium according to claim (1) or (2), wherein the organizing function includes a function configured to organize the recommended set on the basis of a predetermined evaluation formula, the recommended set being constituted by the game element configuration, the game element configuration becoming more advantageous than an enemy character appearing in the event.

(4)

The non-transitory computer-readable medium according to claim (1) or (2), wherein the organizing function includes a function configured to organize the recommended set that is constituted by the game element configuration, information regarding a play level value of the game element constituting the recommended set and information regarding a play level value set up to the event satisfying a predetermined same-level condition in the game element configuration.

(5)

The non-transitory computer-readable medium according to any one of claims (1) to (4), wherein the organizing function further includes a function configured to organize the strongest set, the strongest set being constituted by the strongest game element configuration among game elements owned by the user, and wherein the displaying function further includes a function configured to display an image, the image causing the user to recognize information regarding the recommended set and information regarding the strongest set.

(6)

The non-transitory computer-readable medium according to any one of claims (1) to (5), wherein the event is an event regarding a fight against an enemy character.

(7)

A non-transitory computer-readable medium including a program product for causing a server to realize at least one function of the functions that the program product described in any one of claims (1) to (6) causes the user terminal to realize, the server being capable of communicating with the user terminal.

(8)

A computer into which the program product contained in the non-transitory computer-readable medium according to any one of claims (1) to (7) is installed.

(9)

A system for controlling progress of a video game, the system comprising a communication network, a server, and a user terminal, a set constituted by at least one game element being used in the video game, the system comprising:

a specifying section configured to specify an event to be carried out by the user;

an organizing section configured to refer to the event to organize a recommended set, the recommended set being constituted by a game element configuration that satisfies a predetermined condition; and a displaying section configured to display an image, the image causing the user to recognize information regarding the recommended set organized by the organizing section.

(10)

The system according to claim (9), wherein the server includes the specifying section and the organizing section, and wherein the user terminal includes:

a receiving section configured to receive information for displaying the image from the server; and the displaying section.

(11)

A non-transitory computer-readable medium including a program product for causing a server to realize functions to control progress of a video game, a set constituted by at least one game element being used in the video game, a user owning the at least one game element, wherein the functions include:

a specifying function configured to specify an event to be carried out by the user;

an organizing function configured to refer to the event to organize a recommended set, the recommended set being constituted by a game element configuration that satisfies a predetermined condition; and a displaying function configured to carry out a process to cause a display device included in a user terminal to display an image, the image causing the user to recognize information regarding the recommended set organized by the organizing function.

(12)

A non-transitory computer-readable medium including a program product for causing a user terminal to realize functions to control progress of a video game, a set constituted by at least one game element being used in the video game, a user owning the at least one game element, wherein a server include:

a specifying function configured to specify an event to be carried out by the user;

an organizing function configured to refer to the event to organize a set a recommended set, the recommended set being constituted by a game element configuration that satisfies a predetermined condition; and a displaying function configured to carry out a process to cause a display device included in the user terminal to display an image, the image causing the user to recognize information regarding the recommended set organized by the organizing function, and wherein the functions include:

a receiving function configured to receive, from the server, information for displaying the image.

(13)

A non-transitory computer-readable medium including a program product for causing a user terminal to realize at least one function of the functions that the program product described in claim (11) causes the server to realize, the user terminal being capable of communicating with the server.

(14)

A server into which the program product contained in the non-transitory computer-readable medium according to claim (12) is installed.

(15)

A method of controlling progress of a video game, a set constituted by at least one game element being used in the video game, a user owning the at least one game element, the method comprising:

a specifying process configured to specify an event to be carried out by the user;

an organizing process configured to refer to the event to organize a recommended set, the recommended set being constituted by a game element configuration that satisfies a predetermined condition; and a displaying process configured to display an image, the image causing the user to recognize information regarding the recommended set organized by the organizing process.

(16)

A method of controlling progress of a video game by a system, the system including a communication network, a server, and a user terminal, a set constituted by at least one game element being used in the video game, a user owning the at least one game element, the method comprising:

a specifying process configured to specify an event to be carried out by the user;

an organizing process configured to refer to the event to organize a recommended set, the recommended set being constituted by a game element configuration that satisfies a predetermined condition; and a displaying process configured to display an image, the image causing the user to recognize information regarding the recommended set organized by the organizing process.

According to one of the embodiments of the present invention, it is useful for a video game in which a set constituted by at least one game element owned by a user is used.

What is claimed is:

1. A non-transitory computer-readable medium including a program product for causing a user terminal to realize functions to control progress of a video game, a set constituted by at least one game element being used in the video game, a user owning the at least one game element, wherein the functions include:

a specifying function configured to specify, via a processor, an event to be carried out by the user;

an organizing function configured to refer, via the processor, to the event to organize a recommended set, the recommended set being constituted by a game element configuration that satisfies a predetermined condition;

a displaying function configured to display, on a display, an image, the image causing the user to recognize information regarding the recommended set organized by the organizing function, wherein the displaying function further includes a function configured to display an image including a region and an input region, the user being caused to recognize the information regarding the recommended set thus organized by the region, and the input region being configured to receive an input from the user;

a receiving function configured to receive, via a receiver, an input against the input region; and a progress controlling function configured to control, via the processor, progress of the event based on the recommended set.

2. The non-transitory computer-readable medium according to claim 1, wherein the organizing function includes a function configured to organize the recommended set on the basis of a predetermined evaluation formula, the recommended set being constituted by the game element configuration, the game element configuration becoming more advantageous than an enemy character appearing in the event.

3. The non-transitory computer-readable medium according to claim 1, wherein the organizing function includes a function configured to organize the recommended set that is constituted by the game element configuration, information regarding a play level value of the game element constituting the recommended set and information regarding a play level value set up to the event satisfying a predetermined same-level condition in the game element configuration.

4. The non-transitory computer-readable medium according to claim 1, wherein the organizing function further includes a function configured to organize the strongest set, the strongest set being constituted by the strongest game element configuration among game elements owned by the user, and wherein the displaying function further includes a function configured to display an image, the image causing the user to recognize information regarding the recommended set and information regarding the strongest set.

5. The non-transitory computer-readable medium according to claim 1, wherein the event is an event regarding a fight against an enemy character.

6. A non-transitory computer-readable medium including a program product for causing a server to realize at least one function of the functions that the program product described in claim 1 causes the user terminal to realize, the server being capable of communicating with the user terminal.

7. A computer into which the program product contained in the non-transitory computer-readable medium according to claim 1 is installed.

8. A system for controlling progress of a video game, the system comprising a server and a user terminal connected by a communication network, a set constituted by at least one game element being used in the video game, the system being configured to:

specify, via a processor, an event to be carried out by the user;

refer, via the processor, to the event to organize a recommended set, the recommended set being constituted by a game element configuration that satisfies a predetermined condition;

display, on a display, an image, the image causing the user to recognize information regarding the recommended set, the displayed image including a region and an input region, the user being caused to recognize the information regarding the recommended set thus organized by the region, and the input region being configured to receive an input from the user;

receive, via a receiver, an input against the input region; and control, via the processor, progress of the event based on the recommended set.

9. A non-transitory computer-readable medium including a program product for causing a server to realize functions to control progress of a video game, a set constituted by at least one game element being used in the video game, a user owning the at least one game element, wherein the functions include:

a specifying function configured to specify, via a processor, an event to be carried out by the user;

an organizing function configured to refer, via the processor, to the event to organize a recommended set, the recommended set being constituted by a game element configuration that satisfies a predetermined condition;

a displaying function configured to carry out a process to cause a user terminal to display an image, the image causing the user to recognize information regarding the recommended set organized by the organizing function, wherein the displaying function further includes a function configured to display an image including a region and an input region, the user being caused to recognize the information regarding the recommended set thus organized by the region, and the input region being configured to receive an input from the user;

a receiving function configured to receive, via a receiver, an input against the input region; and a progress controlling function configured to control, via the processor, progress of the event based on the recommended set.

* * * * *